United States Patent Office

3,141,888
Patented July 21, 1964

3,141,888
1a,7b-DIHYDRO-1H-CYCLOPROPA[c]-
QUINOLINES
Bernard Loev, Broomall, Pa., assignor to Smith Kline &
French Laboratories, Philadelphia, Pa., a corporation
of Pennsylvania
No Drawing. Filed Apr. 29, 1963, Ser. No. 276,151
7 Claims. (Cl. 260—289)

This invention relates to novel 1a,7b-dihydro-1H-cyclopropa[c]quinolines having pharmacodynamic activity. More specifically, these compounds have central nervous system activity such as sedative and muscle relaxant activity. This invention also relates to intermediates for preparing the pharmacologically active cyclopropa[c]quinolines.

The new cyclopropa[c]quinolines of this invention are represented by the following formula:

FORMULA I

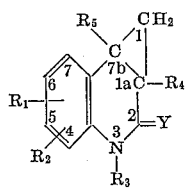

when:

Y is oxygen or sulfur;
$R_1$ is hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl or sulfamoyl;
$R_2$ is hydrogen, halogen, hydroxy, lower alkoxy or, together with $R_1$, methylenedioxy;
$R_3$ is hydrogen, lower alkyl, di-lower alkylamino-lower alkylene, hydroxy or lower alkoxy; and
$R_4$ and $R_5$ are hydrogen or lower alkyl.

Advantageous compounds of this invention are represented by the following formula:

FORMULA II

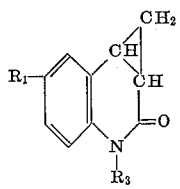

when:

$R_1$ is hydrogen, chloro or trifluoromethyl and
$R_3$ is lower alkyl.

In addition this invention relates to new 3-benzyl-1a,7b-dihydro-1H-cyclopropa[c]quinolines represented by the following formula:

FORMULA III

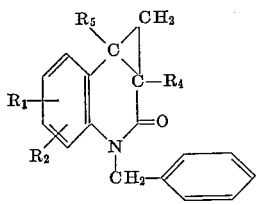

when:

$R_1$ is hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl or sulfamoyl;
$R_2$ is hydrogen, halogen, hydroxy, lower alkoxy or, together with $R_1$, methylenedioxy; and
$R_4$ and $R_5$ are hydrogen or lower alkyl.

The 3-benzyl compounds are useful as intermediates in the preparation of the corresponding pharmacologically active N-unsubstituted cyclopropa[c]quinolines as is described herebelow.

The terms "lower alkyl," "lower alkoxy" and "lower alkanoyl" where used herein denote groups having 1–4 carbon atoms preferably 1–2 carbon atoms, "lower alkylene" denotes groups having 2–4 carbon atoms preferably 2 carbon atoms and "halogen" denotes chloro, bromo or fluoro.

The cyclopropa[c]quinolines are prepared by the following procedure:

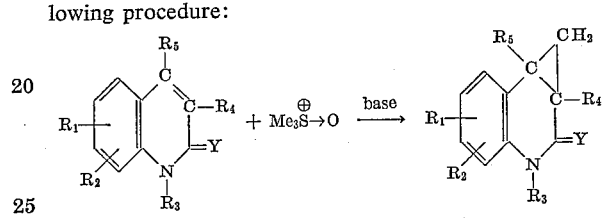

The terms Y, $R_4$ and $R_5$ are as defined above,
$R_1$ is hydrogen, halogen, trifluoromethyl, lower alkyl, lower alkoxy, nitro, mono-lower alkylamino, di-lower alkylamino, lower alkanoylamino, lower alkoxycarbonyl, carbamoyl or sulfamoyl;
$R_2$ is hydrogen, halogen, lower alkoxy or, together with $R_1$, methylenedioxy; and
$R_3$ is lower alkyl, di-lower alkylamino-lower alkylene, benzyloxy, lower alkoxy or benzyl.

According to the above procedure the appropriate carbostyril is reacted with trimethyl sulfoxonium iodide. The reaction is carried out in a suitable unreactive solvent such as dimethyl, sulfoxide, tetrahydrofuran, diethyleneglycol, or diethyl ether in the presence of a strong base such as sodium hydride, lithium hydride or sodium acetylide. The reaction is preferably carried out at temperatures of about 50–75° C. The reaction mixture is worked up by pouring it onto ice, extracting with a water-immiscible solvent such as ether or methylene chloride, removing the solvent in vacuo and distilling or recrystallizing the product.

The compounds of Formula I in which $R_1$ is amino are prepared by reducing the corresponding nitro compounds either by catalytic hydrogenation or chemically as, for example, with stannous chloride in hydrochloric acid and the compounds in which $R_1$ is carboxy are prepared by hydrolyzing the corresponding lower alkoxycarbonyl compounds. The compounds in which $R_1$ and/or $R_2$ are hydroxy and in which $R_3$ is hydroxy are prepared by cleavage of the corresponding methoxy and benzyloxy compounds, respectively.

The N-benzyl intermediates of Formula III are hydrogenated in the presence of, for example, platinum in acetic acid, to give the corresponding N-unsubstituted cyclo propa[c]quinolines of this invention. Alternatively, the N-unsubstituted compounds of this invention are prepared by catalytic hydrogenation of the N-hydroxy-cyclopropa[c]quinolines. The nitro substituted compounds of Formula I in which $R_3$ is hydrogen are prepared by oxidizing the corresponding amino compounds.

The thio compounds of this invention, i.e., the compounds of Formula I in which Y is sulfur, are prepared by treating the corresponding oxo compounds with phosphorus pentasulfide. Alternatively, these compounds are prepared by reacting a thiocarbostyril with trimethyl sulfoxonium iodide by the procedure described above.

The carbostyril starting materials are either known to the art or are prepared by the following procedures or by other methods known to the art:

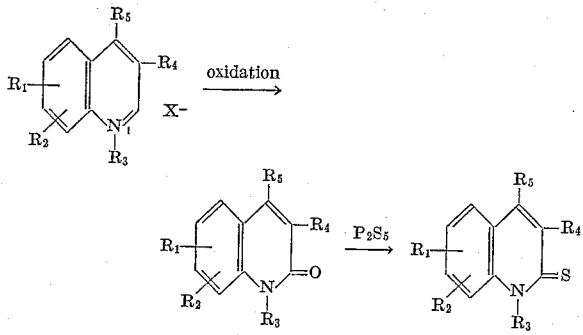

The terms $R_4$ and $R_5$ are as defined above, $R_1$ is hydrogen, halogen, trifluoromethyl, lower alkyl, lower alkoxy, nitro, mono-lower alkylamino, di-lower alkylamino, lower alkanoylamino, lower alkoxycarbonyl, carbamoyl or sulfamoyl;

$R_2$ is hydrogen, halogen, lower alkoxy or, together with $R_1$, methylenedioxy;

$R_3$ is lower alkyl, di-lower alkylamino-lower alkylene or benzyl and

X is an anion.

According to the above procedure, a quaternary salt of a quinoline is oxidized, for example, by use of potassium ferricyanide and sodium hydroxide solution, to give the N-lower alkylcarbostyril. The thiocarbostyrils are prepared by treating the corresponding carbostyril compound with phosphorus pentasulfide.

The N-benzyloxy and N-lower alkoxy carbostyril starting materials are prepared by oxidizing the quinoline oxides by the procedure described above, treating the resulting N-hydroxy compound with potassium or sodium hydroxide and reacting the resulting salt with an excess of a benzyl halide or an alkylating agent such as a lower alkyl halide or dimethylsulfate.

The following examples are not limiting but are illustrative of the compounds of this invention and the processes for their preparation.

*Example 1*

To a suspension of 58 g. of trimethyl sulfoxonium iodide [E. J. Corey, M. Chaykovsky, J. Am. Chem. Soc., 84:867–8 (1962)] in dimethyl sulfoxide is added portionwise 11.85 g. of 53.4% suspension of sodium hydride in mineral oil. There is some hydrogen evolution; the mixture warms up spontaneously. A stream of dry nitrogen is passed continuously over the reaction mixture. The mixture is stirred for one hour and then is treated with a solution of 10.6 g. of N-methylcarbostyril in dimethyl sulfoxide. The stirring is continued at room temperature for 30 minutes then at 60–70° C. for 2.5 hours. After standing overnight at room temperature, the suspension is poured onto ice and the supernatant layer is extracted with ether and methylene chloride. This extract is dried, filtered and concentrated to give a two-layered residual oil which is dissolved in acetonitrile and extracted with petroleum ether. The acetonitrile solution is concentrated to dryness, dissolved in methylene chloride, rinsed with water, dried, filtered and concentrated to give an oil. This oil is molecularly distilled (temperature of the heating bath is 98–104° C. at 0.005 mm.) to give 1a, 7b-dihydro-3-methyl-1H-cyclopropa[c]quinolin-2-one.

*Example 2*

A solution of 85.7 g. of 6-trifluoromethylquinoline in chloroform is treated with 60.5 g. of methyl sulfate. The resulting mixture is refluxed for one hour, concentrated in vacuo and the residue treated with acetone and ether and filtered to give the methosulfate salt of 6-trifluoromethylquinoline, M.P. 135–138° C.

To a stirred mixture of 180 g. of potassium ferricyanide in 700 ml. of water and 1.8 l. of 5% sodium hydroxide solution is added a solution of 73.5 g. of 6-trifluoromethylquinoline methosulfate in 350 ml. of water, keeping the solution at —5° C. The reaction mixture is allowed to warm to 10° C., then filtered. The solid material is recrystallized from hexane to give 1-methyl-6-trifluoromethylcarbostyril, M.P. 85–89° C.

By the procedure of Example 1, 15.0 g. of 1-methyl-6-trifluoromethylcarbostyril in dimethyl sulfoxide is added to a suspension of 58 g. of trimethyl sulfoxonium iodide in dimethyl sulfoxide to which 11.8 g. of a 53.4% suspension of sodium hydride in mineral oil has been added. The resulting mixture is stirred at 70° C. for three hours then is worked up as in Example 1 to give 1a,7b-dihydro-3 - methyl-6-trifluoromethyl-1H-cyclopropa[c]quinolin-2-one.

*Example 3*

To a mixture of 7.0 g. of 1a,7b-dihydro-3-methyl-6-trifluoromethyl-1H-cyclopropa[c]quinolin-2-one and 7.5 g. of phosphorus pentasulfide is added 30 ml. of pyridine. The resulting mixture is refluxed for two hours, then is poured onto ice and extracted with chloroform and methylene chloride. The organic layer is extracted with water, dried over magnesium sulfate, filtered and concentrated to give 1a,7b-dihydro-3-methyl-6-trifluoromethyl-1H-cyclopropa[c]quinolin-2-thione.

*Example 4*

By the procedure of Example 1 the following carbostyrils are reacted with trimethyl sulfoxonium iodide in dimethyl sulfoxide containing sodium hydride:

1-butyl-4-methylcarbostyril
1-benzyl-6-chlorocarbostyril to give:

3-butyl-1a,7b-dihydro-7b - methyl - 1H-cyclopropa[c]quinolin-2-one and 3-benzyl - 6-chloro - 1a,7b-dihydro - 1H-cyclopropa[c]quinolin-2-one.

The above prepared 3-benzyl-6-chloro-a,7b-dihydro-1H-cyclopropa[c]quinolin-2-one is hydrogenated using platinum as catalyst in acetic acid to give after filtering, concentrating and distilling 6-chloro-1a,7b-dihydro-1H-cyclopropa[c]quinolin-2-one.

*Example 5*

According to the procedure of Example 2 the following quinolines:

6,7-methylenedioxyquinoline
6-bromoquinoline
6-nitroquinoline
6-acetamidoquinoline
6-methlaminoquinoline
6-dimethylaminoquinoline are converted to the corresponding 1-methylcarbostyril and reacted by the method of Example 1 with trimethyl sulfoxonium iodide in dimethyl sulfoxide containing sodium hydride to give the following products:

1a,7b - dihydro - 3 - methyl-5,6-methylenedioxy-1H-cyclopropa[c]quinolin-2-one,

6 - bromo - 1a,7b - dihydro-3-methyl-1H-cyclopropa[c]quinolin-2-one, 1a,7b-dihydro-3-methyl-6-nitro-1H-cyclopropa[c]quinolin-2-one, 6-acetamido-1a,7b-dihydro-3-methyl-1H-cyclopropa[c]quinolin-2-one, 1a,7b-dihydro-3-methyl-6-methylamino-1H-cyclopropa[c]quinolin-2-one and 1a,7b-dihydro-3-methyl-6-dimethylamino-1H-cyclopropa[c]quinolin-2-one, respectively.

Hydrogenation of 1a,7b - dihydro-3-methyl-6-nitro-1H-cyclopropa[c]quinolin-2-one in ethanol containing Raney nickel as the catalyst gives after filtering and removing the solvent in vacuo 6-amino-1a,7b-dihydro-3-methyl-1H-cyclopropa[c]quinolin-2-one.

Example 6

A mixture of 6.2 g. of 1-ethyl-4-methylcarbo-styril, 29 g. of trimethyl sulfoxonium iodide, 1.1 g. of lithium hydride in tetrahydrofuran is heated with stirring at 70° C. for three hours to give after, cooling, pouring the reaction mixture onto ice, extracting with ether and distilling the extract, 3 - ethyl-1a,7b-dihydro-7b-methyl-1H-cyclopropa[c]quinolin-2-one.

By the procedure of Example 3 the above prepared quinolin-2-one is refluxed with phosphrous pentasulfide and pyridine to give 3-ethyl-1a,7b-dihydro-7b-methyl-1H-cyclopropa[c]quinolin-2-thione.

Example 7

The following quinolines are converted to the corresponding carbostyrils by the procedure of Example 2:

6-methoxycarbonylquinoline
6-sulfamoylquinoline
6,7-dimethoxyquinoline
5,7-dichloroquinoline
7-methylquinoline
6-chloro-3-methylquinoline
6-quinolinecarboxamide
8-chloroquinoline
6-methoxyquinoline
6,7-dimethoxyquinoline and the resulting carbostyrils are reacted with trimethl sulfoxonium iodide to give the following products:

1a, 7b - dihydro - 6 - methoxycarbonyl-3-methyl-1H-cyclopropa[c]quinolin-2-one,
1a,7b - dihydro - 3 - methyl-6-sulfamoyl-1H-cyclopropa[c]quinolin-2-one,
1a,7b - dihydro - 5,6-dimethoxy-3-methyl-1H-cyclopropa[c]quinolin-2-one,
5,7-dichloro-1a,7b-dihydro-3-methyl-1H-cyclopropa[c]quinolin-2-one,
1a,7b - dihydro - 3,5-dimethyl-1H-cyclopropa[c]quinolin-2-one,
6-chloro-1a,7b-dihydro-1a-methyl-1H-cyclopropa[c]quinolin-2-one,
6-carbamoyl-1a,7b-dihydro-3-methyl-1H-cyclopropa[c]quinolin-2-one,
4-chloro-1a,7b-dihydro-3-methyl-1H-cyclopropa[c]quinolin-2-one,
1a,7b - dihydro - 6 - methoxy-3-methyl-1H-cyclopropa[c]quinolin-2-one and
1a,7b - dihydro - 5,6-dimethoxy-3-methyl-1H-cyclopropa[c]quinolin-2-one respectively.

Refluxing the last compound prepared above with hydrobromic acid in acetic acid for four hours gives, after working up by concentrating in vacuo and recrystallizing the residue, 1a,7b - dihydro-5,6-dihydroxy-3-methyl-1H-cyclopropa[c]quinolin-2-one.

Similarly, treating 1a,7b - dihydro-6-methoxy-3-methyl-1H-cyclopropa[c]quinolin-2-one with hydrobromic acid in acetic acid, the corresponding 6-hydroxy compound is obtained.

Example 8

According to the procedure of Example 1 the following carbostyrils are reacted with trimethyl sulfoxonium iodide in dimethyl sulfoxide containing sodium hydride:

1-(2-dimethylaminoethyl)carbostyril
1-ethoxycarbostyrill to give the following products:

1a,7b-dihydro-3-(2-dimethylaminoethyl)-1H-cyclopropa[c]quinolin-2-one and
1a,7b - dihydro - 3 - ethoxy-1H-cyclopropa[c]quinolin-2-one, respectively.

Example 9

A suspension of 10.8 g. of 1-hydroxycarbostyril in ethanol is treated with 3.8 g. of posassium hydroxide in ethanol and the resulting mixture is heated to reflux, then cooled and 6.3 ml. of dimethylsulfate is added. The mixture is heated for four hours, then cooled and filtered. The filtrate is concentrated and the residue dissolved in water and methylene chloride. The organic layer is separated, dried and concentrated to give the 1-methoxy carbostyril which on recrystallization from hexane melts at 73-74° C.

A solution of 11.5 g. of 1-methoxycarbostyril in dimethyl sulfoxide is added to 58 g. of trimethyl sulfoxonium iodide in dimethyl sulfoxide containing 11.8 g. of a 53.4% suspension of sodium hydride in mineral oil. The mixture is stirred at 60–70° C. for three hours, then worked up as in Example 1, to give 1a,7b-dihydro-3-methoxy-1H-cyclopropa[c]quinolin-2-one.

Example 10

An ethanol solution of 1a,7b-dihydro-6-methoxy carbonyl - 3 - methyl - 1H - cyclopropa[c]quinolin - 2 - one, prepared as in Example 7, is refluxed with an excess of 10% sodium hydroxide solution to give, after extracting with ether and evaporating the ether in vacuo, 6-carboxy-1a,7b - dihydro - 3 - methyl - 1H - cyclopropa[c]quinolin - 2-one.

Example 11

By the procedure of Example 9, 1-hydroxy-carbostyril is treated with potassium hydroxide and then with benzyl bromide to give 1-benzyloxycarbostyril which is reacted with trimethyl sulfoxonium iodide in dimethyl sulfoxide containing sodium hydride to give 3-benzyloxy-1a,7b-dihydro - 1H-cyclopropa[c]quinolin-2-one. Hydrogenation using a palladium catalyst gives 1a,7b-dihydro-3-hydroxy-1H-cyclopropa[c]quinolin-2-one.

What is claimed is:

1. A compound having the formula:

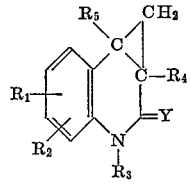

in which:
Y is a member of the group consisting of oxygen and sulfur;
$R_1$ is a member of the group consisting of hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl and sulfamoyl;
$R_2$ is a member of the group consisting of hydrogen, halogen, hydroxy, lower alkoxy and, together with $R_1$, methylenedioxy;
$R_3$ is a member of the group consisting of hydrogen, lower alkyl, di-lower alkylamino-lower alkylene, hydroxy and lower alkoxy; and
$R_4$ and $R_5$ are members selected from the group consisting of hydrogen and lower alkyl.

2. A compound having the formula:

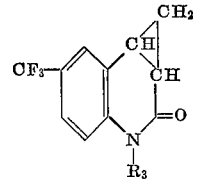

in which $R_3$ is lower alkyl.

3. A compound having the formula:

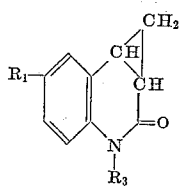

in which $R_1$ is halogen and $R_3$ is lower alkyl.

4. A compound having the formula:

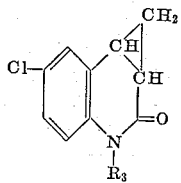

in which $R_3$ is lower alkyl.

5. A compound having the formula:

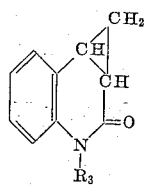

in which $R_3$ is lower alkyl.

6. A compound having the formula:

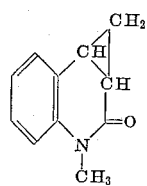

7. A compound having the formula:

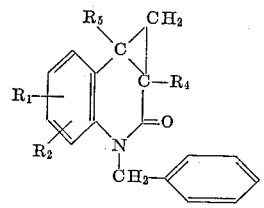

in which:
  $R_1$ is a member of the group consisting of hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl and sulfamoyl;
  $R_2$ is a member of the group consisting of hydrogen, halogen, hydroxy, lower alkoxy and, together with $R_1$, methylenedioxy; and
  $R_4$ and $R_5$ are members selected from the group consisting of hydrogen and lower alkyl.

No references cited.